July 10, 1928.
P. O. ROWLANDS
1,676,802
CHANGE SPEED GEARING
Filed May 8, 1925
2 Sheets-Sheet 1
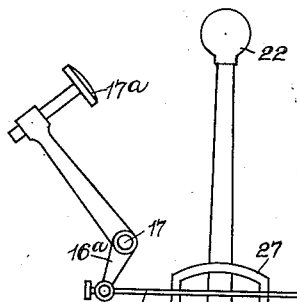
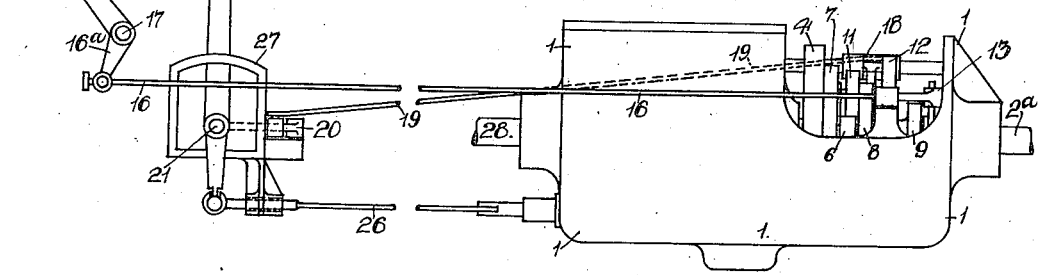
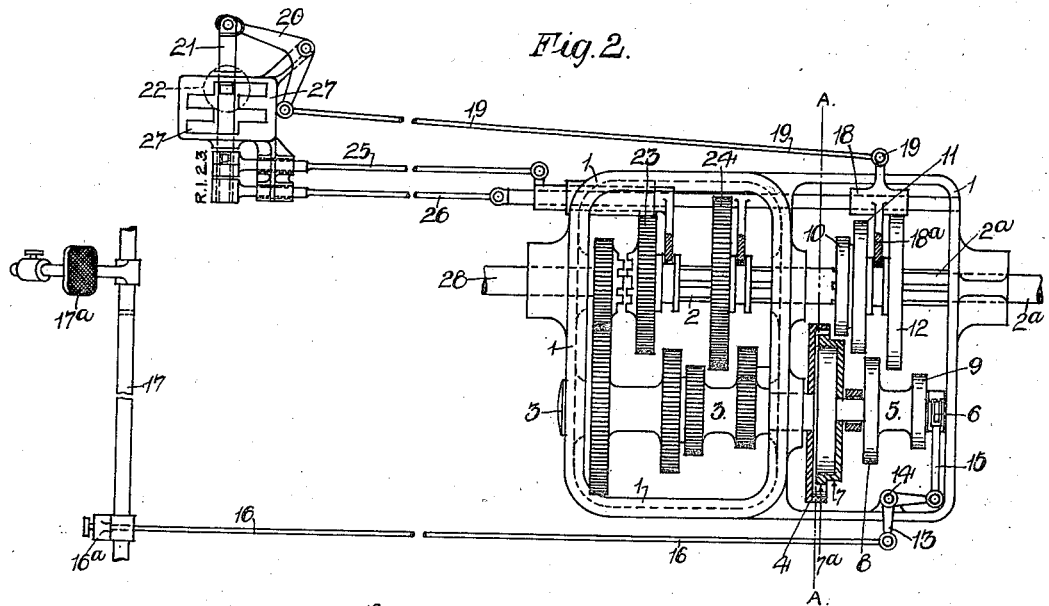
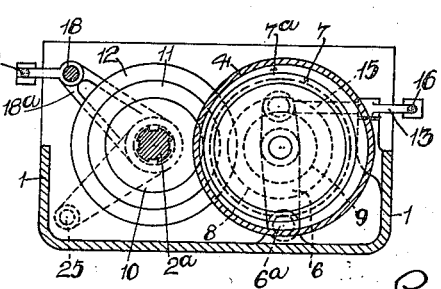
Inventor:-
Percy O. Rowlands
by Barthel & Barthel
Attorneys.

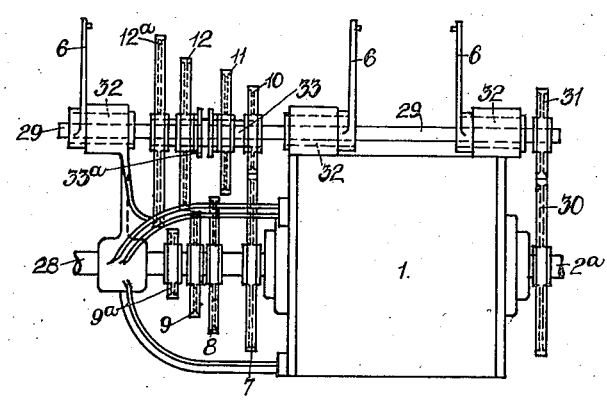
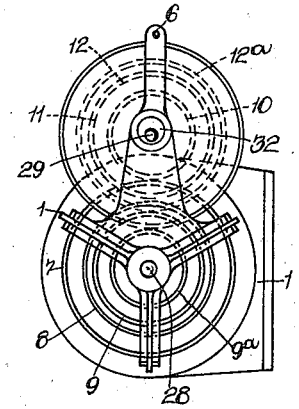
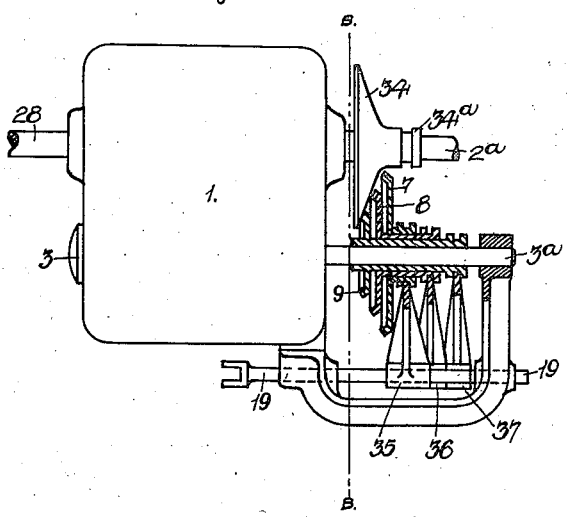
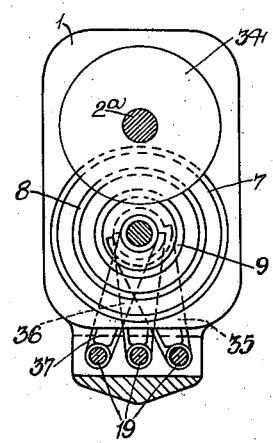

Patented July 10, 1928.

1,676,802

UNITED STATES PATENT OFFICE.

PERCY OCTAVIUS ROWLANDS, OF BIRMINGHAM, ENGLAND.

CHANGE-SPEED GEARING.

Application filed May 8, 1925, Serial No. 28,920, and in Great Britain May 20, 1924.

This invention relates to change speed gearing of the type in which toothed wheels are moved, preferably in an axial direction, in and out of mesh one with another; and has for its object to provide means whereby this operation may be effected without undue shock or noise.

In order that this object may be accomplished it is necessary that the tooth or pitch-line velocity of the wheels which are about to engage with one another should be approximately equal.

In general motor vehicle practice, the gear changing operation is entirely dependent upon the skill and judgment of the driver in manipulating the engine and customary friction clutch.

According to my invention, however, the tooth speeds of the engaging gear wheels are made approximately equal before engagement, by driving one of the gear wheel carrying shafts from the other through the medium of friction wheels and motion derived from the road wheels or their equivalent.

In carrying this invention into effect on a motor vehicle of conventional design, the gear box would preferably be a separate unit disposed on the chassis in the usual position for such a unit.

My invention consists in the application to or combination with speed changing mechanism of the gear-box type, wherein toothed wheels are moved into engagement with one another, or where they are in constant mesh and dog-clutches are employed to engage them, of a plurality of friction discs or wheels mounted on any of the gear box shafts, or on extensions thereof, and adapted to be brought into operative engagement for the purpose of transmitting suitable relative motion to the toothed gear wheels which are about to engage; certain of the friction discs or wheels being connected to the gear changing lever, or its equivalent in such manner that a movement of the gear changing lever selects and brings the appropriate friction disc or wheel into position for subsequent engagement with a co-acting friction wheel operated by the clutch pedal.

I will further describe my invention with the aid of the accompanying sheets of explanatory drawings, which illustrate, by way of examples only, three modes of carrying the invention into effect.

In said drawings:—

Figs. 1 to 3, inclusive illustrate one and the preferred form of embodiment.

Figs. 4 and 5 show another arrangement, and

Figs. 6 and 7 show a further modification.

In the several views like characters of reference denote like or equivalent parts wherever they occur.

Referring first, more particularly, to Figs. 1 to 3, in which:—

Fig. 1 is an elevation,

Fig. 2 is a plan with the gear-box cover removed, and

Fig. 3 is a section, taken as on line A—A, Fig. 2.

The gear box shown is of the usual three speed type, with friction wheels added in an extension of its casing.

1 indicates the gear box casing, and 2 the straight through shaft; 3 is the lay shaft upon one end of which is mounted a friction ring 4 having an internal frictional surface. 5 is an intermediate shaft rotatably mounted on rocker arm 6 pivoted at 6ª to the bottom of the casing 1.

Said intermediate shaft 5 has three friction wheels 7, 8 and 9 fixedly mounted thereon, the rim 7ª of wheel 7 being arranged to engage with the inside surface of friction ring 4.

Upon the splined extension 2ª of the straight through shaft 2 are slidably mounted, but so as to rotate therewith, three friction wheels 10, 11, 12, which are connected together and rotate as one.

13 is a bell-crank lever pivoted at 14 and operatively connected to a link 15 and rod 16; link 15 is also connected to rocker arm 6, and rod 16 is also connected to an arm 16ª on shaft 17 to which is secured the clutch pedal.

The sliding movement of friction wheels 10, 11 and 12 is effected by fork 18ª which forms part of sleeve 18, to which sleeve is also pivoted a rod 19 which is connected to bell crank lever 20. Bell crank lever 20 is also connected to the shaft 21 of the change speed lever 22, this connection being arranged in such manner as to transmit motion axially whilst leaving change speed lever 22 free to oscillate. Change speed lever 22 operates the sliding toothed gears 23, 24 within the gear box 1 in the usual manner through selector mechanism (designated R.1.2.3.) by means of rods 25 and 26.

The method of changing gear is as follows:—

Clutch pedal 17ᵃ is depressed sufficiently to enable change speed lever 22 to be placed in neutral, but not far enough to bring about the engagement of any of the friction wheels on shaft 5, and change speed lever 22 is then moved axially opposite the required slot in the gate change box 27. This axial movement of the change speed lever 22 slides the friction wheels, 10, 11, 12 on shaft 2ᵃ so that the appropriate friction wheel is opposite to its co-acting friction wheel on the intermediate shaft 5; that is, when the change speed lever 22 by its axial movement, is placed opposite the required slot in the gate change box 27, the friction wheel corresponding to that change is automatically moved opposite to its co-acting wheel on intermediate shaft 5, ready for engagement.

Engagement is then effected by a further depression of clutch pedal 17ᵃ through shaft 17, arm 16ᵃ, rod 16, bell crank 13, and link 15 acting upon rocker arm 6 which thus oscillates shaft 5, so that the rim 7ᵃ of friction wheel 7 engages the inside surface of friction ring 4, and the particular pair of friction wheels on shafts 5 and 2ᵃ which are opposite to one another are also more or less simultaneously engaged.

Friction wheels 10, 11 and 12 on shaft 2ᵃ are automatically moved by the axial movement of gear lever 22 through the medium of lever shaft 21, bell crank 20, rod 19 connected to the sliding sleeve 18, and fork 18ᵃ.

By this arrangement the correct relative motion is transmitted by the road wheels—when the clutch on clutch-shaft 28 is disengaged—through the extension shaft 2ᵃ, shaft 2, the particular pair of friction wheels in engagement, shaft 5, and thus, through rim 7ᵃ of friction wheel 7 and friction ring 4, to lay shaft 3.

As the particular pair of toothed gear wheels in gear box casing 1 which are about to be engaged are now rotating at approximately the correct pitch line speed, the gear lever 22 may now be moved by angular motion into its correct slot in gate change box 27 without difficulty, and at the same time sliding the toothed wheel on shaft 2 into engagement with the co-acting toothed wheel on lay shaft 3.

The movement of the toothed gear wheel 24 into the position for reversing the direction of the vehicle is performed as usual and is unaffected by said friction wheels.

In an alternative arrangement the friction wheels 10, 11, 12, may be slid on shaft 5 instead of on the extension shaft 2ᵃ.

Referring now to the modification illustrated in Figs. 4 and 5, in which,

Fig. 4 is a plan and Fig. 5 an end view.

1 represents the casing of a standard four speed gear box, and 2ᵃ is an extension of the straight-through shaft; 29 is an external shaft mounted on the gear box. Fixed on extension 2ᵃ of the straight-through shaft is a friction wheel 30, preferably having a tyre of friction material, and on the adjacent end of the shaft 29 is a co-acting friction wheel 31.

Upon the clutch shaft 28 are four friction wheels 7, 8, 9, 9ᵃ, and on the corresponding end of the shaft 29 are four co-acting friction wheels 10, 11, 12 and 12ᵃ having tyres of friction material. Said shaft 29 is mounted (so as to move transversely) in eccentric bushes 32 which are connected to the clutch pedal by means of rocker arms 6, similarly as in Fig. 2.

When the friction clutch is in normal engagement the position of the eccentric bushes will be such that all the friction wheels on shaft 29 will be out of contact with the friction wheels on the clutch shaft 28 and the friction wheel on extension 2ᵃ of the straight-through shaft, and shaft 29 will, therefore, not be rotating.

Friction wheels 10, 11, 12, and 12ᵃ are mounted upon a splined sleeve 33 adapted to be slid on shaft 29 by means of a fork, similar to fork 18ᵃ of Figs. 1 to 3, which engages a collar 33ᵃ. This axial movement of sleeve 33 enables any friction wheel thereon to be moved opposite to its co-acting friction wheel on clutch shaft 28.

Sleeve 33 is connected to the gear lever 22 through mechanism as shown in Fig. 2, and is similarly operated.

The operation of changing gear is carried out as hereinbefore described with reference to Figs. 1 to 3.

The friction wheels in the positions shown in Fig. 4, are in fourth speed, and shaft 29 is being rotated through friction wheels 30 and 31, and is thus rotating clutch shaft 28 at a speed equivalent to the direct drive: similarly, clutch shaft 28, whenever the clutch pedal 17ᵃ is depressed to its limit, will be rotated at a speed depending upon which of the friction wheels have been moved opposite to one another, and the lay shaft will be rotated through the usual constant mesh gear wheels.

Referring now to Figs. 6 and 7 in which:—

Fig. 6 is a plan and Fig. 7 an end view of a standard three speed gear box.

34 is a conical friction disc slidably disposed on an extension 2ᵃ of the straight-through shaft and rotating therewith. Concentrically mounted on the intermediate shaft 3ª which forms an extension of the lay shaft are friction discs 7, 8, and 9 having sleeve portions which preferably fit one inside the other, and being keyed or splined to each other and to the intermediate shaft 3ª so that they may slide independent of each other and rotate together.

It will be readily understood, of course, that while disk 34 is shown as a single member having a conical face which co-operates with each of the opposing disks, said member is an equivalent of the disks 10, 11 and 12 of Fig. 2 of the drawing, the latter being operatively connected together to move as a unit. This equivalency will be understood from the fact that the particular annular zone of the conical face which co-operates with either of the complemental disks, performs the same function as the annular face of the disks 10, 11 and 12. There is a difference in the shape of the faces, but the faces co-operate in a similar manner in both forms—the difference structurally is found in the fact that the disk unit of Fig. 2 is an assembled unit, while disk 34 is produced as a unit; instead of filling the spaces between disks 10, 11 and 12 to produce the single disk formation, the disks are made as individuals and then assembled to function as a unit.

Forks 35, 36 and 37—secured to rods 19 and operated in similar manner to that already described with reference to Figs. 1 to 3—are adapted to slide the respective friction discs clear of engagement with the conical friction disc 34.

In operation, the gear lever in moving axially opposite to the required slot of the gate change box engages one of the rods 19 and brings the periphery of the appropriate friction disc 7, 8 or 9, nearer to the revolving cone friction disc 34, so that it is necessarily engaged by said disc 34 when the latter is moved axially by the depression of the clutch pedal, acting through a fork (similar to fork 18ª of Figs. 1 to 3) which engages collar 34ª, by means of mechanism as shown in Fig. 2 and thus rotates the lay shaft at the desired speed.

What I claim as my invention and desire to secure by Letters Patent is:—

1. In change speed gearing, a gear set of the selective change speed type wherein normally-disengaged parts are selectively brought into engagement for power transmission activity at desired speeds, clutch mechanism including a pedal for controlling the transmission of power, manually-operable mechanism for controlling the engagement and disengagement of the normally-disengaged parts, said latter mechanism including a rock shaft mounted for axial and oscillating movements, operable connections between the rock shaft and certain of the normally-disengaged parts whereby axial movement of the rock shaft will select the parts to be engaged and oscillating movements of the rock shaft will complete engagement of the selected parts, and means for synchronizing the speed of the normally-disengaged parts about to be engaged for power transmission purposes, said means including disks having annular faces mounted respectively on driven and synchronizing shafts and adapted to provide power transmission between said shafts at different speeds by engagement of normally-disengaged disk faces in pairs of which the faces of the pairs are carried by the respective shafts, operable connections between the disk arrangement of one of the shafts and the rock shaft for positioning the faces thereof relative to the companion faces of the pairs to locate the faces of the desired pair in relative positions for engagement, operable connections between the clutch pedal and the disk arrangement of the other shaft to complete engagement of the positioned faces of a pair, and normally-disengaged connections between the synchronizing shaft and the gear set and adapted to be engaged by clutch pedal movement.

2. Gearing as in claim 1 characterized in that the clutch-pedal connections extend to the disk arrangement of the synchronizing shaft.

3. Gearing as in claim 1 characterized in that the operable connections lead from the rock shaft to the disk arrangement of the driven shaft and are rendered active for selection of pairs by the axial movement of the rock shaft, whereby the normally-disengaged parts of the gear set are selected and of the disk arrangement carried by the driven shaft will be positioned concurrently by the axial movement of the rock shaft.

4. Gearing as in claim 1 characterized in that the clutch-pedal connections lead to the disk arrangement of the synchronizing shaft, and the rock-shaft connections to the disk arrangement of the driven shaft, with the latter connections made active by the axial movement of the rock shaft, the cycle of operation being such that the normally-disengaged parts of the gear set and the disk arrangement of the driven shaft are selected for engagement by movement of the rock shaft with the selected pair of disk faces then brought into engagement by clutch-pedal manipulation, and with the selected parts of the gear set then brought into engagement by oscillation of the rock shaft.

5. Gearing as in claim 1 characterized in that the synchronizing and driven shafts extend in parallelism.

6. Gearing as in claim 1 characterized in that the gear set and the disk arrangements have a common driven shaft.

7. Gearing as in claim 1 characterized in that the connections from the rock shaft lead to the disk arrangement of the driven shaft and are adapted to provide axial movement of the disk faces by the axial movement of the rock-shaft.

8. Gearing as in claim 1 characterized in that the connections from the clutch-pedal lead to the disk arrangement of the synchronizing shaft and are adapted to provide substantially-radial movement of the disk faces of such shaft in engaging and disengaging pairs of disks.

9. Gearing as in claim 1 characterized in that the connections from the rock-shaft lead to the disk arrangement of the driven shaft and are adapted to provide axial movement of the disk faces of such shaft, and that the connections from the clutch-pedal lead to the disk arrangement of the synchronizing shaft and are adapted to provide substantially-radial movement of the disk faces of the latter shaft in engaging and disengaging pairs of disk faces.

In testimony whereof I affix my signature.

PERCY OCTAVIUS ROWLANDS.